United States Patent
Colven et al.

(10) Patent No.: US 9,923,731 B1
(45) Date of Patent: Mar. 20, 2018

(54) SEAMLESS MIGRATION FROM MULTIPLE SPANNING TREE PROTOCOL TO ETHERNET RING PROTECTION SWITCHING PROTOCOL

(71) Applicant: Fujitsu Limited, Kawasaki-Shi Kanagawa (JP)

(72) Inventors: Davin Michael Colven, Dallas, TX (US); Maitreya Mukhopadhyay, Allen, TX (US); Hariprasad Sudharshan, Chennai (IN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/262,991

(22) Filed: Sep. 12, 2016

(51) Int. Cl.
*H04L 12/26* (2006.01)
*H04L 12/437* (2006.01)
*H04L 12/24* (2006.01)
*H04L 12/46* (2006.01)

(52) U.S. Cl.
CPC ........ *H04L 12/437* (2013.01); *H04L 12/4641* (2013.01); *H04L 41/0654* (2013.01)

(58) Field of Classification Search
CPC ...................................................... H04L 12/66
See application file for complete search history.

(56) References Cited

U.S. PATENT DOCUMENTS

| | | | | |
|---|---|---|---|---|
| 6,430,151 B1 * | 8/2002 | Glas | .......................... | H04L 1/22 370/222 |
| 8,355,348 B1 * | 1/2013 | Miller | ................... | H04L 12/462 370/256 |
| 9,385,885 B2 | 7/2016 | Kulkami et al. | | |
| 9,699,021 B2 | 7/2017 | Behrens et al. | | |
| 2005/0201409 A1 * | 9/2005 | Griswold | ................ | H04L 12/42 370/445 |
| 2007/0025275 A1 * | 2/2007 | Tallet | ...................... | H04L 45/02 370/255 |
| 2007/0140147 A1 * | 6/2007 | Touve | ................. | H04L 12/4641 370/255 |
| 2007/0171814 A1 * | 7/2007 | Florit | .................... | H04L 12/437 370/216 |

(Continued)

FOREIGN PATENT DOCUMENTS

WO    WO 2009019168 A1 *  2/2009  ............. H04L 12/24

*Primary Examiner* — Asad Nawaz
*Assistant Examiner* — Berhanu Belete
(74) *Attorney, Agent, or Firm* — Baker Botts L.L.P.

(57) ABSTRACT

Methods and systems are provided for migrating loop-breaking protocols in an Ethernet network. The method includes selecting a virtual local area network (VLAN) implementing a multiple spanning tree protocol (MSTP) from a plurality of VLANs operating on the Ethernet network, the MSTP having a spanning tree with a root network element coupled to a first branch of network elements; disabling a virtual network link in the VLAN; migrating a first leaf network element of the first branch in the VLAN by disabling the MSTP and enabling an Ethernet ring protection switching (ERPS) protocol on the first leaf network element; migrating the root network element in the VLAN after the first leaf network element by disabling the MSTP and enabling the ERPS protocol on the root network element; and enabling the virtual network link after migrating the first leaf network element and the root network element.

13 Claims, 6 Drawing Sheets

(56) References Cited

U.S. PATENT DOCUMENTS

| | | | |
|---|---|---|---|
| 2008/0198769 A1* | 8/2008 | Tzeng | H04L 12/462 370/256 |
| 2008/0250124 A1* | 10/2008 | Rentschler | H04L 12/437 709/220 |
| 2008/0279203 A1* | 11/2008 | Ramalho Ribeiro dos Santos | H04L 45/02 370/406 |
| 2009/0022069 A1* | 1/2009 | Khan | H04L 12/4633 370/256 |
| 2009/0249115 A1* | 10/2009 | Bycroft | H04L 12/462 714/47.1 |
| 2010/0238800 A1* | 9/2010 | Teng | H04L 12/437 370/225 |
| 2010/0309821 A1* | 12/2010 | Sergeev | H04L 12/462 370/256 |
| 2011/0317555 A1* | 12/2011 | Kleineberg | H04L 12/40176 370/230 |
| 2012/0201539 A1 | 8/2012 | Boertjes et al. | |
| 2012/0250695 A1* | 10/2012 | Jia | H04L 12/42 370/400 |
| 2013/0003608 A1* | 1/2013 | Lei | H04L 12/462 370/256 |
| 2013/0058349 A1* | 3/2013 | Khalil | H04L 45/12 370/400 |
| 2013/0064071 A1* | 3/2013 | Bos | H04L 12/437 370/223 |
| 2013/0121164 A1* | 5/2013 | Shabtay | H04L 41/0663 370/241.1 |
| 2013/0254356 A1* | 9/2013 | Eastlake et al. | H04L 45/74 709/220 |
| 2014/0133360 A1* | 5/2014 | Chiueh | H04L 41/12 370/256 |
| 2014/0169155 A1* | 6/2014 | Li | H04L 12/42 370/223 |
| 2014/0293774 A1* | 10/2014 | Behrens | H04L 12/437 370/225 |
| 2014/0307539 A1* | 10/2014 | Li | H04L 41/0659 370/218 |
| 2017/0063617 A1* | 3/2017 | Sudharshan | H04L 45/02 |

* cited by examiner

SEAMLESS MIGRATION FROM MULTIPLE SPANNING TREE PROTOCOL TO ETHERNET RING PROTECTION SWITCHING PROTOCOL

BACKGROUND

Field of the Disclosure

The present disclosure relates to computer networking, and more specifically, migration from multiple spanning tree protocol to Ethernet ring protection switching protocol.

Description of the Related Art

Ethernet networks are often comprised of network elements communicating information back and forth to each other. Information may be communicated between network elements in the form of data packets, or blocks of data individually sent and delivered. The network elements (e.g., routers, switches, and bridges) may process incoming data packets to determine the appropriate network link on which to forward the data packet in order for the data packet to reach its target destination.

A loop among network elements (i.e., a network loop) may degrade network performance or cause network failure. Thus, loop-breaking protocols may be implemented in a network to prevent loops from occurring between the network elements. Examples of loop-breaking protocols include spanning tree protocol (STP), rapid spanning tree (RSTP), multiple spanning tree (MSTP), and Ethernet ring protection switching (ERPS) protocol as defined by the Institute of Electrical and Electronic Engineers (IEEE) 802 standards and the International Telecommunications Union Telecommunication Standardization Sector (ITU-T) Recommendations G.8032.

SUMMARY

In particular embodiments, a method includes selecting a virtual local area network (VLAN) implementing a multiple spanning tree protocol (MSTP) from a plurality of VLANs operating on the Ethernet network, the MSTP having a spanning tree with a root network element coupled to a first branch of network elements. The method further includes disabling a virtual network link in the VLAN. The method also includes migrating a first leaf network element of the first branch in the VLAN by disabling the MSTP and enabling an Ethernet ring protection switching (ERPS) protocol on the first leaf network element. In addition, the method includes migrating the root network element in the VLAN after the first leaf network element by disabling the MSTP and enabling the ERPS protocol on the root network element. Also, the method includes enabling the virtual network link after migrating the first leaf network element and the root network element.

In another embodiment, a network element includes a processor configured to select a virtual local area network (VLAN) implementing a multiple spanning tree protocol (MSTP) from a plurality of VLANs operating on the Ethernet network, the MSTP having a spanning tree with a root network element coupled to a first branch of network elements. The processor is further configured disable a virtual network link in the VLAN. The processor is also configured to migrate the first leaf network element of the first branch in the VLAN by disabling the MSTP and enabling an Ethernet ring protection switching (ERPS) protocol on the first leaf network element. The processor is further configured to migrate the root network element in the VLAN after the first leaf network element by disabling the MSTP and enabling the ERPS protocol on the root network element. The processor is also configured to enable the virtual network link after migrating the first leaf network element and the root network element.

In another embodiment, a method includes selecting a virtual local area network (VLAN) implementing a multiple spanning tree protocol (MSTP) from a plurality of VLANs operating on the Ethernet network, the MSTP having a spanning tree with a root network element coupled to a first branch of network elements. The method further includes disabling a virtual network link in the VLAN and disabling the MSTP on the first leaf network element of the first branch. The method also includes disabling the MSTP on the root network element after the first leaf network element and enabling Ethernet ring protection switching (ERPS) protocol on the first leaf network element. The method further includes enabling ERPS protocol on the root network element after the first leaf network element. The method also includes enabling the virtual network link after enabling ERPS protocol on the first leaf network element and the root network element.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
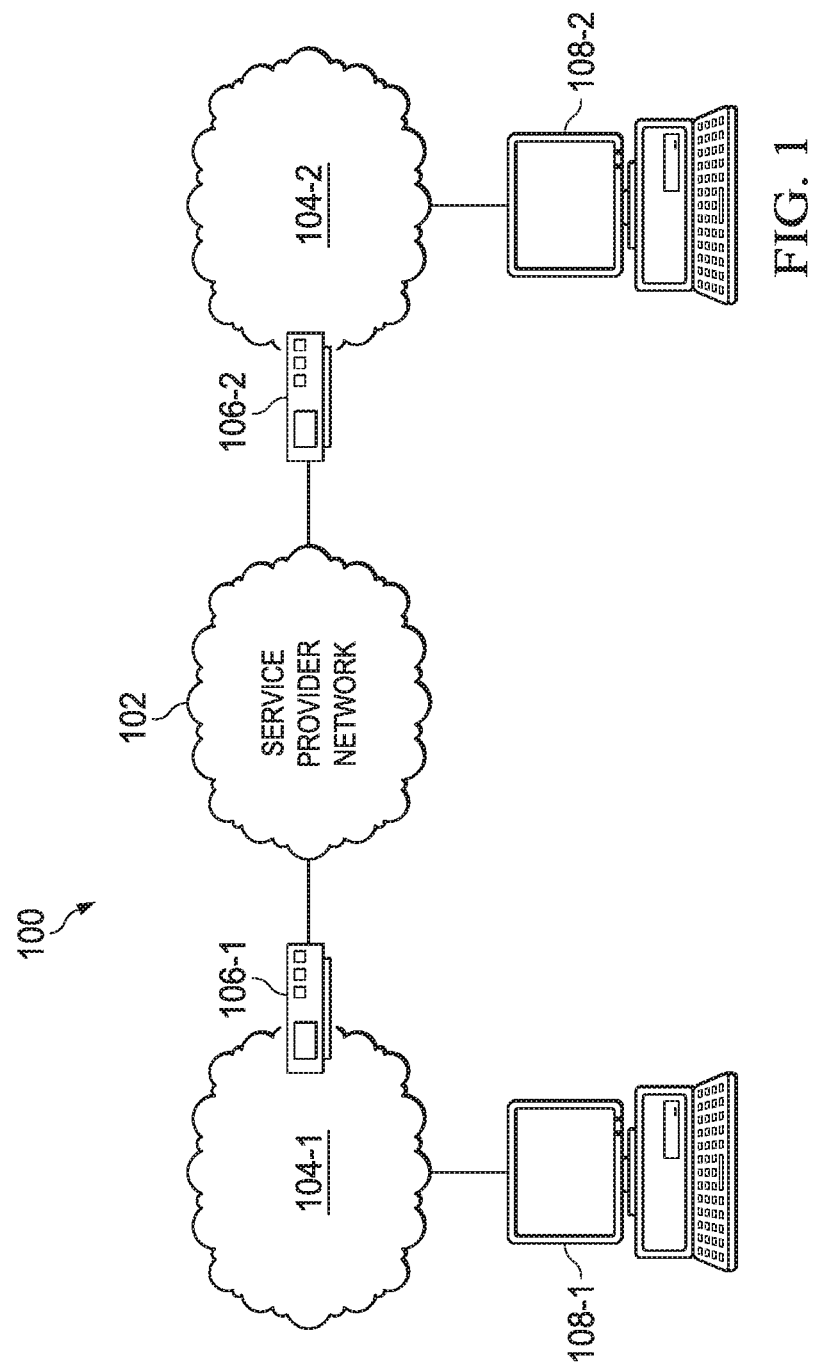
FIG. 1 illustrates a block diagram of selected elements of an embodiment of a general network according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" refers to an instance of a device class, which may be referred to collectively as devices "72" and any one of which may be referred to generically as device "72".

In an Ethernet network, a network element may function as a bridge, analyzing incoming data packets and directing them to the appropriate outgoing network links based on the destination address of the data packet. The bridge may "learn" the network topology by analyzing the source addresses of the incoming data packets at each link and building an address table of network elements connected to that link. When an incoming data packet arrives, the bridge may look for the destination address within its network address table to determine the network link(s) on which to send the data packet. If the destination address is in its address table, then the bridge may forward the data packet on the appropriate network link associated with the destination address in the address table so that the data packet may ultimately reach its destination. However, if the destination address is not in its address table, then the bridge may flood the data packet to all outgoing links. A loop among the network elements may cause a network storm to occur as the network elements rebroadcast the data packet, ultimately reaching back to the source, which itself may rebroadcast the packet again. A network storm may cause network performance to degrade or possibly result in a network failure as rebroadcasting of data packets consumes exponentially increasing network resources.

In order to prevent a network storm, an Ethernet network may use a loop-breaking protocol, such as spanning tree protocol (e.g., spanning tree protocol, rapid spanning tree protocol, and multiple spanning tree protocol) or Ethernet ring protection switching (ERPS) protocol (e.g., G.8032), to disable links between particular network elements in order to ensure a loop-free network topology. The loop-breaking protocol may block traffic on a port at one or more network elements to disable one or more network links between network elements. Disabling a network link may prevent the flow of data packets on the particular link, which may in turn disable loops in the network and prevent a network storm from occurring. In addition to disabling network loops, the loop-breaking protocol may also assist in maintaining a connected network in the event of a network failure. For example, the loop-breaking protocol may enable a disabled network link (e.g., by unblocking a previously blocked port) if another network link or network element unexpectedly fails. Thus, the loop-breaking protocol may prevent network loops and help restore network connectivity in the event of a network failure.

It may be desirable to migrate from one loop-breaking protocol to another loop-breaking protocol in a network. For example, Ethernet ring protection switching (ERPS) protocol may be optimized for networks configured in a ring topology. By contrast, multiple spanning tree protocol (MSTP) may be designed to function in any network topology, requiring additional overhead and lacking optimizations for a ring network. Thus, a ring network using ERPS protocol may recover faster from a network failure compared to a ring network using MSTP. Accordingly, migrating from MSTP to ERPS protocol in a ring network may improve overall network performance and reliability. However, migrating from MSTP to ERPS protocol may result in network outages or degraded performance during the migration. As will be described in detail herein, the present disclosure provides a novel solution for migrating from MSTP to ERPS protocol to minimize effects on network performance and reliability during the migration.

FIG. 1 illustrates a block diagram of selected elements of an embodiment of a general network according to the present disclosure. Customer networks 104-1 and 104-2 may be communicatively coupled through service provider network 102. Namely, service provider network 102 may be configured to receive and transport traffic between the customer networks. In particular embodiments, customer network 104-1, customer network 104-2, and/or service provider network 102 may include one or more transport networks. Customer networks 104-1 and 104-2 may couple to service provider network 102 via one or more customer edge devices 106, representing a user network interface or a demarcation between customer networks 104-1 and 104-2, and service provider network 102. Customer edge device 106 may be any suitable system operable to transmit and receive network traffic, such as network element 202 disclosed with respect to FIG. 2. As an example and not by way of limitation, customer edge device 106 may be a router or switch located at or near the customer premises.

One or more customer systems 108 may be communicatively coupled to customer network 104-1 and 104-2. For example, customer system 108-1 may be coupled to customer network 104-1, and customer system 108-2 may be coupled to customer network 104-2. Although shown as desktop computer systems, customer system 108 may be any device that communicatively couples to a network, including for example, a computer, PDA, consumer electronic device, network storage device, network printer, or another suitable device and may vary in size, shape, performance, functionality, and price. Customer system 108-1 may desire to communicate information with customer system 108-2 or another system coupled to customer network 104-2. However, customer networks 104-1 and 104-2 may be located at different physical locations or otherwise lack a direct network connection. Therefore, customers may engage the services of a service provider, in the form of service provider network 102, to communicate information between customer networks 104-1 and 104-2. Service provider network 102 may provide forwarding of network traffic between various customer systems 108 coupled to customer networks 104-1 and 104-2. Specifically, service provider network 102 may provide Ethernet links to communicatively couple customer networks 104-1 and 104-2, such that in some embodiments, it may appear as though the two networks are a single local area network (LAN).

Modifications, additions, or omissions may be made to network 100 without departing from the scope of the disclosure. The components and elements of network 100 described may be integrated or separated according to particular needs. Moreover, the operations of network 100 may be performed by more, fewer, or other components. For example, in some embodiments, customer network 104 may couple to two or more service provider networks. In some embodiments, service provider network 102 may service a plurality of customers and customer networks 104.

Figure 2:
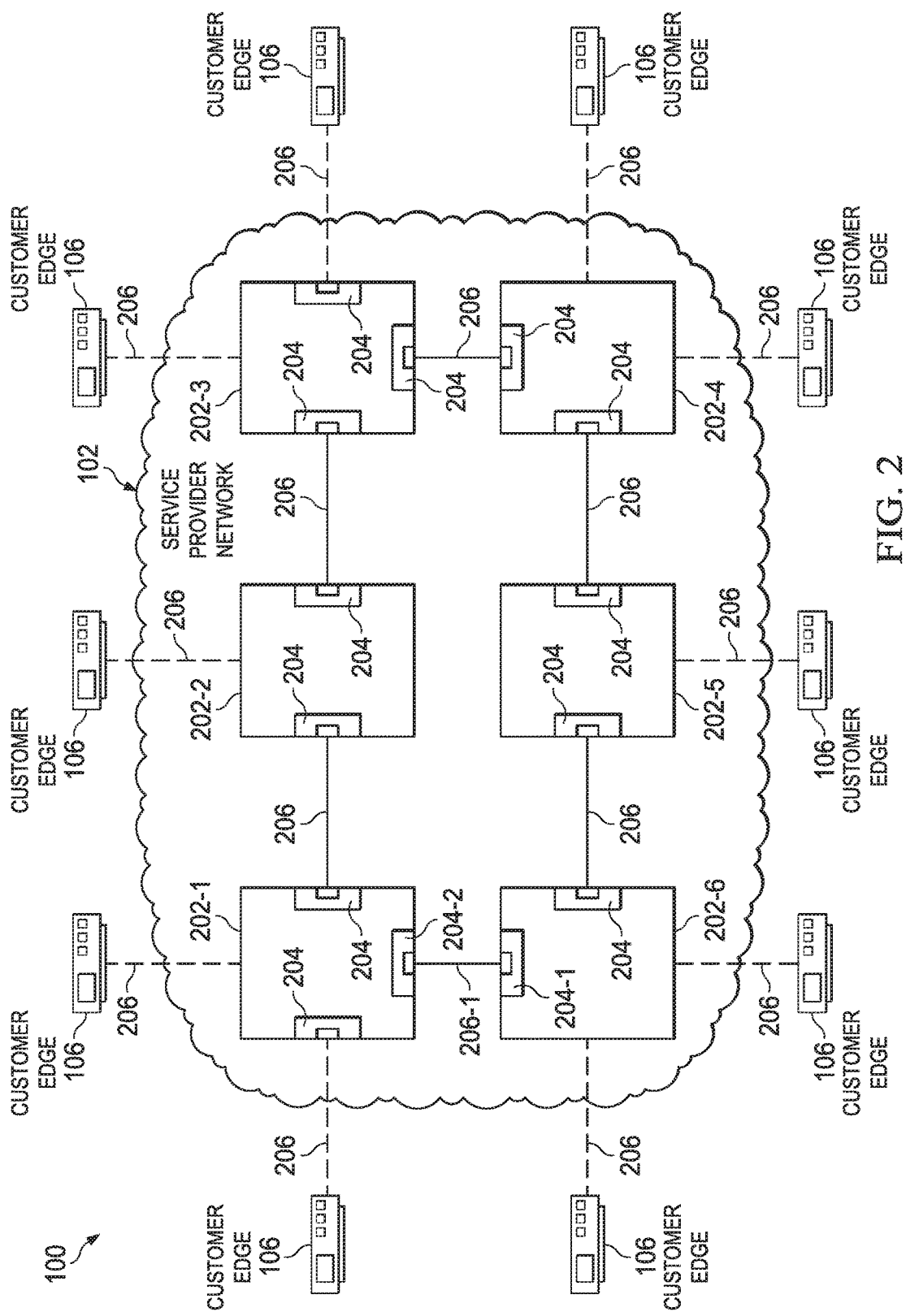
FIG. 2 illustrates a block diagram of selected elements of an embodiment of a network architecture configured in a ring topology.

FIG. 2 illustrates a block diagram of selected elements of an embodiment of exemplary network architecture 100. One or more customer edge devices 106 may be communicatively coupled via service provider network 102, which may represent an implementation of network 100 described above with respect to FIG. 1. Service provider network 102 may include network elements 202 coupled by transmission media 206 through ports 204. In certain embodiments, network elements 202 may also couple to one or more customer edge devices 106 and/or network elements 202 of other networks (not expressly shown) via transmission media 206. In some embodiments, network elements 202 in service provider network 102 may form a ring topology, such as the network ring formed by network elements 202-1202-2202-3202-4202-5202-6 as illustrated in FIG. 2.

Network 100 may include one or more transmission media 206 operable to transport one or more signals communicated by components of network 100. Each transmission medium 206 may include any system, device, or apparatus configured to communicatively couple network elements 202 to each other and communicate information between them. For example, a transmission medium 206 may include an optical fiber, an Ethernet cable, a T1 cable, a Wi-Fi or Bluetooth connection, and/or any other suitable medium.

Network elements 202 (including customer edge devices 106) may communicate information or "traffic" over transmission media 206. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, frames or packets.

Each network element 202 in network 100 may comprise any suitable system operable to transmit and receive network traffic. For example, network element 202 may be a hub, router, switch, bridge, or any other system or device operable to transmit and receive network traffic. In the illustrated embodiment, each network element 202 may be operable to transmit traffic directly to one or more other network elements 202 and receive traffic directly from one or more other network elements 202 via transmission medium 206. As discussed above, customer edge devices 106 may be a type of network element 202. Network elements 202 may support one or more loop-breaking protocols, such as spanning tree protocol (e.g., spanning tree protocol, rapid spanning tree protocol, and multiple spanning tree protocol) or ERPS protocol (e.g., G.8032).

Service provider network 102 may include one or more virtual local area networks (VLAN). A VLAN may represent a group of one or more network elements 202 grouped into a virtual local area network such that the network elements within the VLAN appear to be part of a common, unified local area network. VLANs may be defined on a data link layer (e.g., Open Systems Interconnection layer 2) to include specific network resources, such as particular network elements 202, specific ports 204 of these elements, and/or particular transmission media 206 coupling the ports. Network elements 202 in a VLAN may be communicably coupled by one or more virtual network links. A virtual network link may be implemented with resources of service provider network 102, including for example, one or more network elements 202, transmission media 206, and/or ports 204 illustrated in FIG. 2. Network traffic from one network element 202 in a VLAN may be broadcast to other network elements 202 in the same VLAN over virtual network links, using the underlying network resources that comprise the virtual network link.

In some embodiments, traffic in service provider network 102 may be compartmentalized across one or more VLANs such that the traffic is segregated into isolated broadcast domains (e.g., a broadcast domain for each VLAN). For example, traffic in one VLAN may be accessible to the network elements, users, applications, and/or customer systems within and communicating over the particular VLAN. Service provider network 102 may include one or more VLANs to efficiently control and apportion network resources based on, for example, functional needs, security needs, network usage, network reliability, and/or other considerations.

Figure 3:
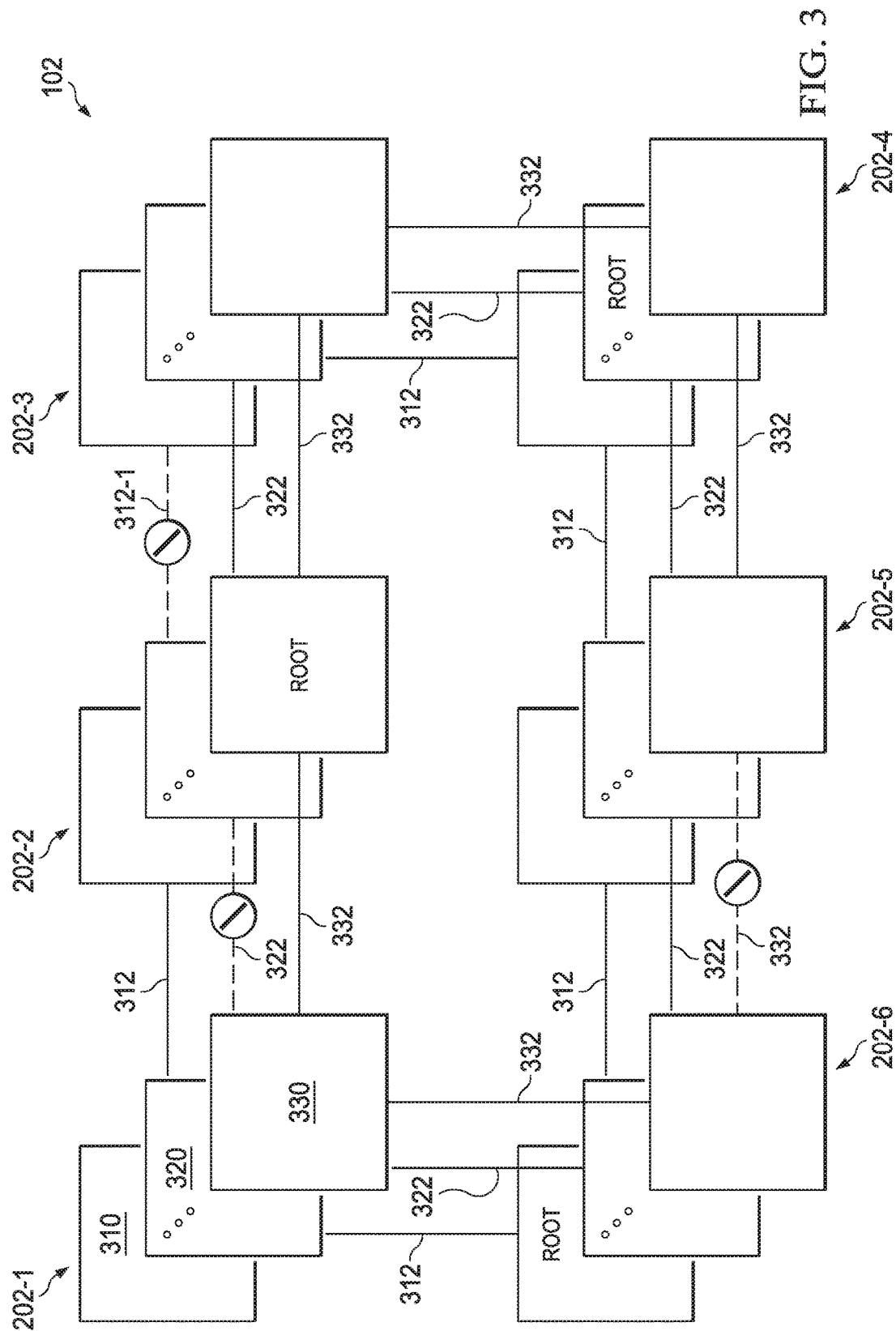
FIG. 3 illustrates a block diagram of representative virtual local area networks implemented on a service provider network.

FIG. 3 illustrates a block diagram of representative virtual local area networks implemented on service provider network 102 illustrated in FIG. 2. Service provider may include VLANs 310, 320, and 330. Each VLAN may include one or more network elements 202. For example, VLANs 310, 320, and 330 include network elements 202-1, 202-2, 202-3, 202-4, 202-5, and 202-6. Network traffic in each VLAN may be sent across virtual network links. For example, network traffic on VLAN 310 may be broadcast to other network elements in VLAN 310 via virtual network links 312. Network traffic on VLAN 320 may be broadcast on virtual network links 322. Network traffic on VLAN 330 may be broadcast via virtual network links 332. As discussed above, virtual network links 312, 322 and 332 may use the ports of network elements 202 and the transmission media coupling these ports to send and receive information.

In some embodiments, particular network resources (e.g., one or more resources of network elements 202, ports 204, and/or transmission media 206) may be apportioned to each VLAN. For example, VLAN 310, 320, and 330 may be apportioned equal network resources (e.g., ⅓ of the transmission capacity of a port and/or transmission medium to each VLAN) or unequal network resources (e.g., ½ of the transmission capacity of a port and/or transmission medium to VLAN 310 and ¼ to each of VLAN 320 and 330). In some embodiments, VLAN 310, 320, and 330 may be assigned unique port 204 and/or transmission media 206 to use. Traffic on VLAN 310, 320, and 330 may be prioritized equally or differently. For example, traffic on VLAN 310 may be given priority to traffic on VLANs 320 and 330, thereby reducing network delay on VLAN 310. Apportionment and prioritization of network resources may be set when a VLAN is created or modified later based on, for example, the functional needs of the network, security, network usage, network reliability, available resources, and/or other considerations related to service provider network 102.

The broadcasting of traffic on individual VLANs in service provider network 102 may result in a network storm as network elements 202 rebroadcast data packets on the virtual network links, ultimately reaching back to the source, which itself may rebroadcast the packet again. Service provider network 102 may implement a loop-breaking protocol to prevent network loops and thus prevent a network storm caused by such loops. For example, service provider network 102 may implement multiple spanning tree protocol (MSTP), as defined by, for example, IEEE 802.1s and/or IEEE 802.1Q-2005. The MSTP may be configured to operate on the VLANs in service provider network 102. For example, the MSTP may identify and block network loops independently for each of VLAN 310, 320, and 330. To do so, the MSTP may configure a spanning tree for each VLAN.

A particular network element 202 may be selected as the root of a spanning tree for a particular VLAN. For example, network element 202-6 may be selected as the root of the spanning tree for VLAN 310, network element 202-4 may be the root for the spanning tree of VLAN 320, and network element 202-2 may be the root for the spanning tree of VLAN 330. The root of each spanning tree may be selected based on actual or anticipated network usage, network reliability, network resources, the topology of the network, geographic proximity of the network resources, and/or other considerations. Although VLAN 310, 320, and 330 each has a different root in FIG. 3, in some embodiments, the same network element 202 may be selected as the root for multiple VLANs.

MSTP may send administrative data packets across the network elements to learn the topology of service provider network 102 and the VLANs within the network. For example, the MSTP may learn the topology of service provider network 102, including VLANs 310, 320, and 330, by sending bridge protocol data units (BPDU) between network elements 202. From the BDPUs, MSTP may configure a spanning tree for each of VLAN 310, 320, and 330. The spanning trees may be used to facilitate the transfer of data packets between the network elements, detect the existence of loop(s) in the network, and determine which virtual network link(s) to disable in order to break such loops.

As described in more detail below with respect to FIGS. 4A-B, the MSTP may disable one or more virtual network links on a VLAN to prevent network loops among the network elements within the VLAN. MSTP may detect a loop in VLAN 310, 320, and 330 (e.g., between network elements 202-1, 202-2, 202-3, 202-4, 202-5, and 202-6). In turn, the MSTP may disable one or more virtual network links to prevent the network loop. For example, virtual network link 312-1 between network element 202-2 and 202-3 may be disabled to block the network loop in VLAN 310. The virtual network link between network element 202-1 and 202-2 may be disabled to block the network loop in VLAN 320. The virtual network link between network element 202-5 and 202-6 may be disabled to block the network loop in VLAN 330. By disabling one or more virtual network links, the MSTP may prevent network loops for each VLAN and thereby prevent a network storm. The MSTP may generate a spanning tree for each VLAN in order to identify whether a network loop exists on a particular VLAN, and if so, to determine which virtual network link to disable to block the network loop.

Figure 4A:
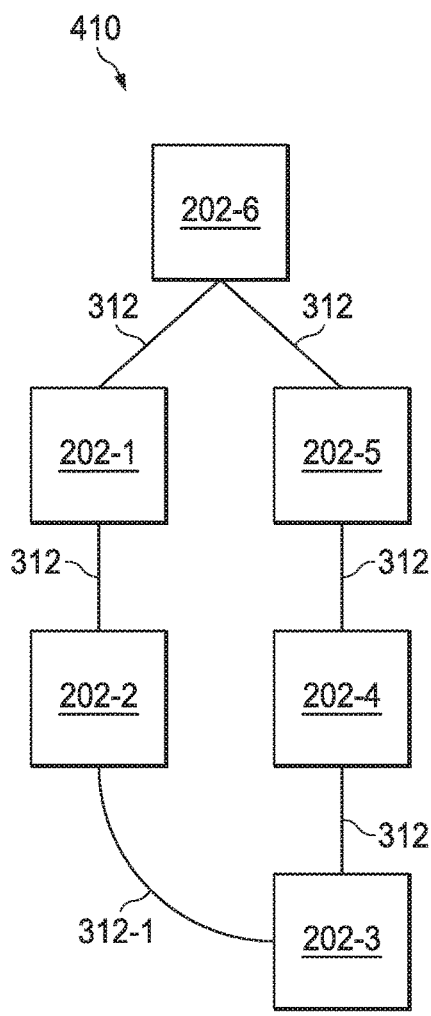
FIG. 4A illustrates a block diagram of a representative spanning tree for selected elements of an embodiment of a network architecture.

FIG. 4A illustrates a block diagram of a representative spanning tree 410 within service provider network 102 illustrated in FIGS. 2 and 3. Spanning tree 410 may correspond with a particular VLAN in service provider network 102. For example, spanning tree 410 may correspond with VLAN 310. Network element 202-6, the network element selected as the root of VLAN 310, is illustrated as the root of spanning tree 410. As described above, the MSTP may send BPDUs between the network elements to create spanning tree 410.

From spanning tree 410, the MSTP may detect the existence of a network loop in VLAN 310. The loop in VLAN 310 is formed by network elements 202-1→202-2→202-3→202-4→202-5→202-6. To break the loop and prevent a network storm, the MSTP may disable one or more virtual network links coupling the network elements.

Figure 4B:
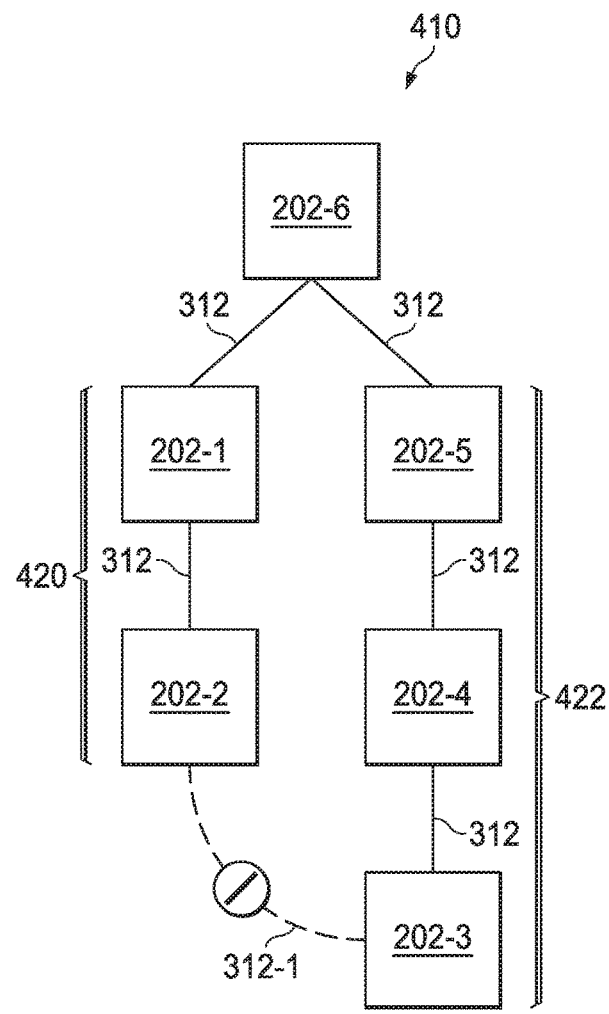
FIG. 4B illustrates a block diagram of a representative spanning tree for selected elements of an embodiment of a network architecture with a disabled virtual network link to break a network loop.

FIG. 4B illustrates a block diagram of a representative spanning tree 410 within service provider network 102 illustrated in FIGS. 2 and 3 with a virtual network link disabled to break a network loop. After detecting the existence of a loop in VLAN 310, the MSTP may disable virtual network link 312-1 between network elements 202-2 and 202-3. For example, the MSTP may block data packets related to VLAN 310 at a port of network elements 202-2 and/or 202-3 such that data packets related to VLAN 310 are no longer permitted to pass across the transmission medium coupling network elements 202-2 and 202-3, thereby disabling virtual network link 312-1. Despite blocking virtual network link 312-1 to data packets related to VLAN 310, the MSTP may continue to permit other traffic (e.g., data packets related to VLAN 320 and 330) to pass between network elements 202-2 and 202-3.

After disabling virtual network link 312-1, spanning tree 410 may be comprised of two branches, one extending from root network element 202-6 to leaf network element 202-2 and the other from root network element 202-6 to leaf network element 202-3. For example, root network element 202-4 may couple to spanning tree branch 420 (e.g., branch network elements 202-1 and leaf network element 202-2) and spanning tree branch 422 (e.g., branch network elements 202-5→202-6 and leaf network element 202-3), representing the active links between network elements 202 in VLAN 310 after the MSTP has rendered the network loop free. Spanning tree branches 420 and 422 may represent the two ring segments between network element 202-6 (the root network element) and network elements 202-2 and 202-3 (the leaf network elements).

Although only VLAN 310 is discussed with respect to FIGS. 4A and 4B, the MSTP may create similar spanning trees for VLANs 320 and 330. For example, the spanning tree for VLAN 320 may have two spanning tree branches from root network element 202-4 to leaf network elements 202-1 and 202-2 (a branch from network elements 202-4→202-5→202-6→202-1 and a branch from network elements 202-4→202-3→202-2). For VLAN 320, network element 202-4 is a root network element, network elements 202-3, 202-5 and 202-6 are branch network elements, and network elements 202-1 and 202-2 are leaf network elements. The virtual network link between leaf network elements 202-1 and 202-2 may be disabled to block the network loop in VLAN 320. The spanning tree for VLAN 330 may have two spanning tree branches from root network element 202-2 to leaf network elements 202-5 and 202-6 (a branch from network elements 202-2→202-3→202-4→202-5 and a branch from network elements 202-2→202-1→202-6). For VLAN 330, network element 202-2 is a root network element, network elements 202-3, 202-4 and 202-1 are branch network elements, and network elements 202-5 and 202-6 are leaf network elements. The virtual network link between leaf network elements 202-5 and 202-6 may be disabled to block the network loop in VLAN 330.

At some time later, a network administrator may desire to migrate service provider network 102 from MSTP to ERPS protocol. As discussed above, ERPS protocol may offer faster recovery times in response to a network failure and/or less overhead associated with maintaining a loop-free topology. For example, ERPS protocol may be optimized for networks configured in a ring topology such that recovery from a network failure may not require computation, provisioning, or the exchange of data between the network elements to respond.

In some embodiments, it may be desirable to migrate from MSTP to ERPS protocol without impacting the performance or reliability of the network and the VLANs configured on the network. For example, the network administrator of service provider network 102 may seek to migrate from MSTP to ERPS protocol without impacting customers or other users communicating via service provider network 102. Disabling the MSTP on network elements 202 may increase administrative traffic as the MSTP on other network elements respond to a perceived network failure (e.g., the disabling of MSTP on a network element in the ring) and/or reconfigure one or more spanning trees (e.g., the spanning tree illustrated in FIGS. 4A and 4B). Increased administrative traffic may slow customer network traffic. Similarly, some data packets may be dropped while the MSTP spanning tree is reconfigured and address tables are updated in the remaining network elements. In addition, performance and reliability of the network may be affected by a network storm if a loop occurs during the migration from MSTP to ERPS protocol. Therefore, it may be desirable to prevent network loops and minimize reconfiguration of the MSTP spanning trees to ensure minimal disruption of the network during the migration. It may also be desirable to maintain the topology of the individual VLANs on the network, such that, for example, the virtual network link(s) that are disabled to prevent a network loop do not change during the migration.

Returning back to FIG. 3, one or more of VLANs 310, 320, and 330 may be migrated from MSTP to ERPS protocol. As discussed above, MSTP may disable one or more virtual network links to prevent a network loop. However, migrating to ERPS protocol may require disabling MSTP before enabling ERPS on individual network elements 202. Disabling MSTP may in turn result in a lapse in loop detection and prevention during the migration process. In order to maintain a loop-free network topology during the migration process, the virtual network link(s) disabled by MSTP may be manually disabled (e.g., without the use of a ring protection protocol) prior to migrating a VLAN from MSTP to ERPS protocol. For example, during the migration of VLAN 310, one or more ports and/or links coupling network elements 202-2 and 202-3 may be manually configured (e.g., by a command and/or setting at a network element 202) to manually disable virtual network link 312-1, such that data packets related to VLAN 310 are no longer permitted to pass across virtual network link 312-1 coupling network elements 202-2 and 202-3. Manually disabling virtual network link 312-1 may prevent a network loop in VLAN 310 during the migration from MSTP to ERPS protocol.

To illustrate, the MSTP related to VLAN 310 on network element 202-3 may be disabled during the migration to ERPS protocol. Disabling the MSTP may cause the MSTP to cease disablement of virtual network link 312-1. However, the manual disabling of virtual network link 312-1 may nonetheless ensure that data packets related to VLAN 310 are unable to pass across virtual network link 312-1 even after the MSTP has been disabled on network element 202-3. Thus, manually disabling virtual network link 312-1 may maintain a loop-free topology for VLAN 310 during the migration from MSTP to ERPS protocol, and thus prevent a network storm from occurring.

The order of disabling MSTP on the network elements for a particular VLAN may be selected to prevent increased administrative traffic and dropped packets during the migration. In some embodiments, the MSTP may be disabled from the leaves of the spanning tree (e.g., network elements 202-2 and 202-3 for VLAN 310) along spanning tree branches 420 and 422 of FIG. 4B. Disabling the MSTP on network elements 202-4, 202-5, 202-1, or 202-6—the non-leaf or branch networks elements from spanning tree 410 illustrated in FIG. 4B—before the leaf network elements may cause the MSTP to respond as though the network element is no longer available, similar to a network failure. As a result, the MSTP may generate administrative traffic as it re-calculates network paths and reconfigures spanning tree 410 to identify which virtual network link(s) to re-enable in order to resume connectivity between the other network elements in VLAN 310. Increased administrative traffic may degrade network performance. In addition, some data packets may be dropped while spanning tree 410 is updated if network elements continue to forward data packets based on out-of-date address tables. By contrast, disabling network elements 202-2 or 202-3 (the leaf network elements) may not cause MSTP updates because the other network elements may continue to communicate along the same virtual network links using the same address tables as before. Disabling MSTP on network elements sequentially along spanning tree branches 420 and 422, from the leaves to the root, may ensure network performance and reliability during the migration of VLAN 310 from the MSTP to ERPS protocol. In some embodiments, the root of the spanning tree may be the last network element in which the MSTP is disabled.

After disabling MSTP for VLAN 310, ERPS protocol may be enabled on the network elements in the VLAN. A network element 202 may be selected as the ring protection link (RPL) owner, charged with disabling or blocking traffic on a particular virtual network link (referred to as the ring protection link) to ensure a loop-free network topology in VLAN 310. In some embodiments, the network element with the port previously blocking VLAN 310 traffic by MSTP may be selected as the RPL owner. In certain embodiments, the ring protection link may be selected such that network traffic is blocked on the same virtual network link that was previously disabled by MSTP (e.g., virtual network link 312-1 for VLAN 310). To illustrate, network element 202-3 (a leaf of spanning tree 410) may be selected as the RPL owner and virtual network link 312-1 between network elements 202-2 and 202-3 (the same link disabled by MSTP before the migration) may be selected as the ring protection link. Selecting the ring protection link to be the same virtual network link that was previously disabled by MSTP may ensure the same topology within VLAN 310. However, a different network element 202 may be selected as the RPL owner and a virtual network link from that network element as the ring protection link if a change in the topology of VLAN 310 is desired.

Once an RPL owner has been selected, the ERPS protocol may be enabled on the network elements in the VLAN. To begin, the ERPS protocol may be enabled for VLAN 310 on the network element selected as the RPL owner. The ERPS protocol may then be enabled on the other network elements 202 in VLAN 310. In some embodiments, the ERPS protocol may be enabled on the network elements in order, proceeding from the RPL owner around the network ring. For example, after enabling ERPS protocol on network element 202-3 (the RPL owner), the ERPS protocol may be enabled on the remaining network elements from 202-4→202-5→202-6→202-1→202-2 or from 202-2→202-1→202-6→202-5→202-4. In certain embodiments, the ERPS protocol may be enabled on the network elements in another order from the RPL owner. Enabling ERPS protocol on network elements 202 in order from the RPL owner may ensure that each network element running ERPS protocol is coupled to the RPL owner via other network elements enabled with ERPS protocol.

With ERPS protocol enabled on all network elements 202 in VLAN 310, the network may now be protected from loops and network failures by the ERPS protocol. Thus, the virtual network link that was manually disabled (e.g., virtual network link 312-1) to protect against network loops during migration may be re-enabled to network traffic on VLAN 310. Despite being enabled, virtual network link 312-1 may still remain blocked or disabled to network traffic on VLAN 310 by the ERPS protocol. That is, RPL owner 202-3 may block data packets related to VLAN 310 from the ring protection link, virtual network link 312-1, in order to prevent a network loop. However, in the event of a network failure, the ERPS protocol may unblock or enable VLAN 310 traffic on virtual network link 312-1 in order to maintain connectivity among the network elements in the VLAN.

Although the present disclosure has been described with respect to service provider network 102, the same methodology may be applied to any network configured in a ring topology, including, for example, customer networks 104 disclosed in FIG. 1. The present disclosure may also apply to different network topologies, including, networks with a ring within a ring, abutting rings, or any other network topology capable of supporting ERPS protocol. In addition, modifications, additions, or omissions may be made to service network 102 without departing from the scope of the disclosure. For example, the components and elements of service network 102 described may be integrated, separated, and rearranged according to particular needs. Moreover, the operations of service network 102 may be performed by more, fewer, or other components. For example, in some embodiments, service provider may include fewer or more network elements 202, transmission media 206, and/or VLANs.

In addition to the migration method described above, service provider network 102 (or any other network capable of supporting ERPS protocol) may be migrated from MSTP to ERPS protocol using either of the methods described in more detail below with respect to FIGS. 5 and 6 while ensuring network performance and reliability are maintained during the migration.

Figure 5:
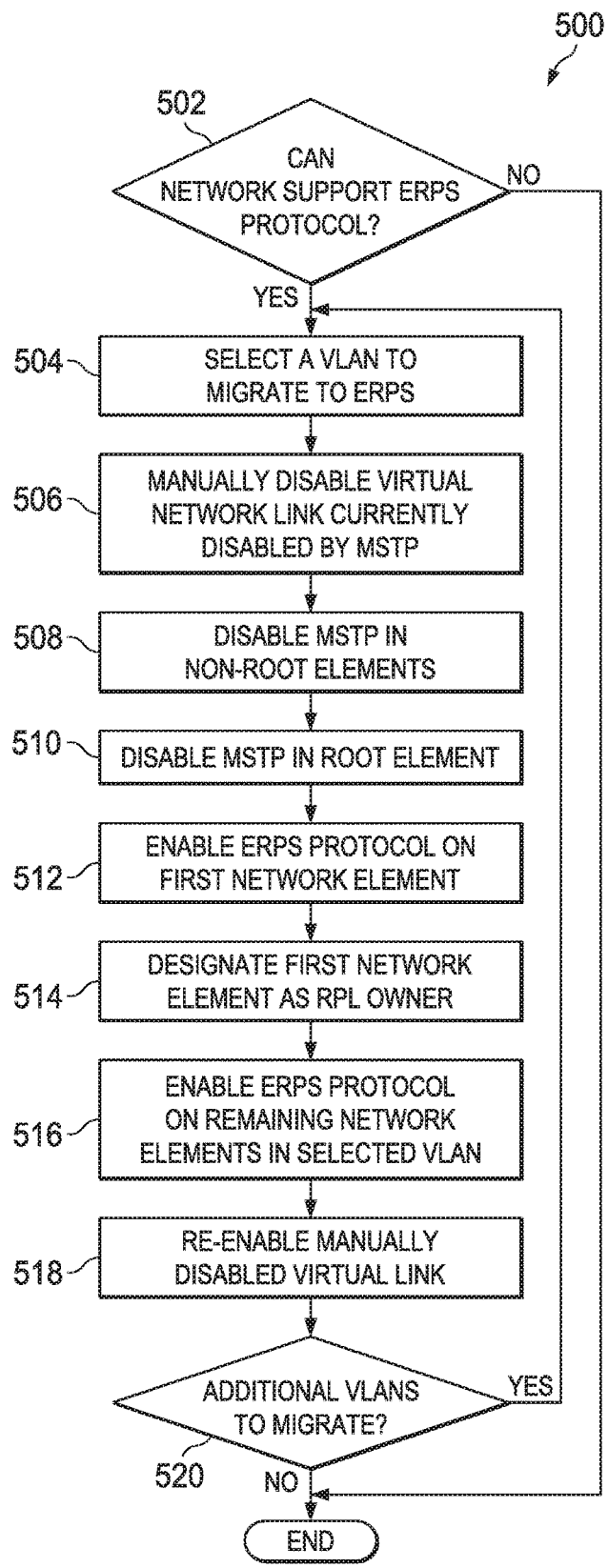
FIGS. 5 and 6 illustrate flowcharts of methods for migrating from multiple spanning tree protocol to Ethernet ring protection protocol in accordance with some embodiments of the present disclosure.

Turning now to FIG. 5, a block diagram of selected elements of an embodiment of method 500 for migrating a network from MSTP to ERPS protocol while ensuring network performance and reliability during the migration. Method 500 may be implemented by network elements 202 disclosed above with respect to FIG. 2. Certain operations depicted in method 500 may be rearranged or omitted, as desired.

Method 500 may begin at step 502 by determining whether the network can support ERPS protocol. If the network cannot support ERPS, then the method may end. The result of step 502 may be NO if the network is not configured in a ring topology or otherwise cannot support ERPS protocol. If however, the network can support ERPS protocol, then method 500 may proceed to step 504 in which a VLAN is selected to migrate from MSTP to ERPS protocol.

At step 506, the virtual network link currently disabled by the MSTP in the selected VLAN may be manually disabled. The virtual network link may be disabled in any manner. For example, a command or setting may disable network traffic related to the selected VLAN through a port, network element, and/or transmission medium associated with the virtual network link. A network element 202 may distinguish between traffic associated with a particular VLAN based on header information (e.g., a VLAN tag) in a data packet.

Next, MSTP for the selected VLAN may be disabled on the non-root elements within the selected VLAN (step 508). In some embodiments, MSTP may be disabled in order from the leaves of the MSTP spanning tree (e.g., network elements 202-2 and 202-3 in FIG. 4B) up the branch network elements in the spanning tree branches (e.g., spanning tree branches 420 and 422) in the direction of the root of the MSTP spanning tree (e.g., network elements 202-6) to reduce administrative traffic and network outages associated with MSTP reconfiguring the spanning tree. After MSTP has been disabled on all non-root network elements, MSTP for the selected VLAN may be disabled on the root network element in step 510.

With MSTP for the selected VLAN disabled on all network elements, ERPS protocol may be enabled on the first network element in step 512. In some embodiments, the first network element enabled with ERPS protocol may be a leaf of the MSTP spanning tree (e.g., network elements 202-2 or 202-3 illustrated in FIG. 4B). Next, the first network element enabled with ERPS protocol may be designated as the RPL owner in step 514.

In step 516, ERPS protocol may be enabled on the remaining network elements in the selected VLAN. As explained with respect to FIGS. 3 and 4, the enabling of ERPS protocol may occur in any order, so long as each network element running ERPS protocol is coupled to the RPL owner via other network elements enabled with ERPS protocol. In some embodiments, the ERPS protocol may be enabled on the network elements by following the network ring from the RPL owner.

Once ERPS protocol has been enabled on all network elements in the selected VLAN, then the virtual network link previously disabled in step 506 may be re-enabled or brought back into service in step 518. For example, a command or setting may be changed such that the previously disabled virtual network link is no longer manually disabled.

At step 520, a determination may be made as to whether additional VLANs need to be migrated. If additional VLANs need to be migrated, then method 500 may proceed back to step 504. Otherwise the method migrating from MSTP to ERPS protocol may be completed.

In some embodiments, network elements in a VLAN may be migrated from MSTP to ERPS protocol one at a time. That is, instead of disabling MSTP on all network elements and then enabling ERPS protocol on the network elements, each network element may be migrated (e.g., by disabling MSTP and then enabling ERPS protocol on the network element) one at a time as the network elements of the network are traversed.

Figure 6:
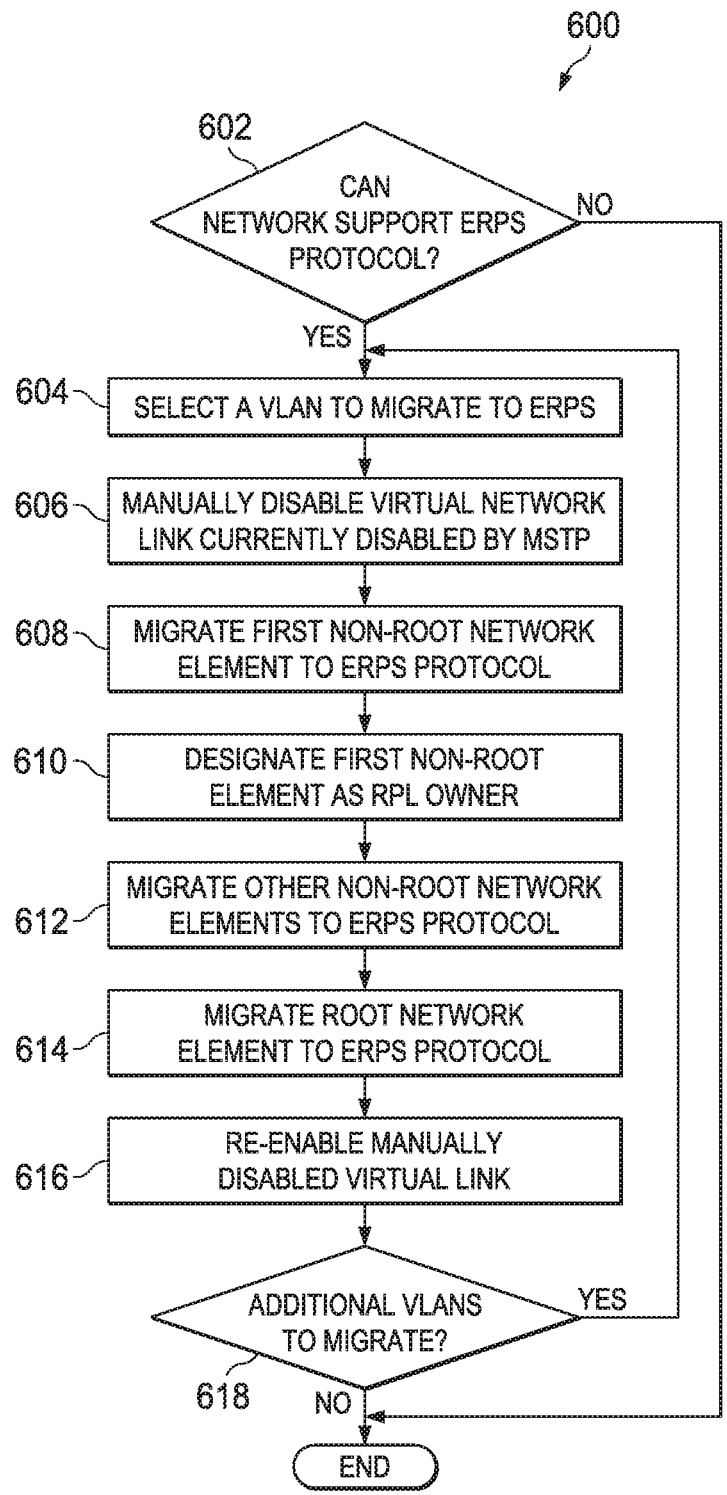

As an example, FIG. 6 illustrates a block diagram of selected elements of an embodiment of method 600 for migrating a network from MSTP to ERPS protocol while ensuring network performance and reliability during the migration. Method 600 may be implemented by network elements 202 disclosed above with respect to FIG. 2. Certain operations depicted in method 600 may be rearranged or omitted, as desired.

Method 600 may begin at step 602 by determining whether the network can support ERPS protocol. If the network cannot support ERPS, then the method may end. The result of step 602 may be NO if the network is not configured in a ring topology or otherwise cannot support ERPS protocol. If however, the network can support ERPS protocol, then method 600 may proceed to step 604 in which a VLAN is selected to migrate from MSTP to ERPS protocol.

At step 606, the virtual network link currently disabled by the MSTP in the selected VLAN may be manually disabled. The virtual network link may be disabled in any manner. For example, a command or setting may disable network traffic related to the selected VLAN through a port, network element, and/or transmission medium associated with the virtual network link.

At step 608, the first non-root network element within the selected VLAN may be migrated by disabling MSTP and enabling ERPS protocol. In some embodiments, the first network element may be a leaf of the MSTP spanning tree for the selected VLAN (e.g., network elements 202-2 and 202-3 from FIG. 4B). Next, the first network element may be designated as the RPL owner in step 610.

At step 612, the other non-root network elements of the selected VLAN may be migrated one network element at a time by disabling MSTP and enabling ERPS protocol. As discussed above in relation to FIGS. 3 and 4, MSTP may be disabled from the leaves to the root of the MSTP spanning tree to reduce administrative traffic and network outages associated with MSTP reconfiguring the spanning tree. In some embodiments, network elements may be migrated in order from the leaves of the MSTP spanning tree (e.g., network elements 202-2 and 202-3 in FIG. 4B) up the branch network elements in the spanning tree branches (e.g., spanning tree branches 420 and 422) in the direction of the root of the MSTP spanning tree (e.g., network elements 202-6) to reduce administrative traffic and network outages associated with MSTP reconfiguring the spanning tree.

Next, the MSTP root network element for the selected VLAN may be migrated in step 614 by disabling MSTP and enabling ERPS protocol.

Once ERPS protocol has been enabled on all network elements in the selected VLAN, then the virtual network link previously disabled in step 606 may be re-enabled or brought back into service in step 616. For example, a command or setting may be changed such that the previously disabled virtual network link is no longer manually disabled.

At step 618, a determination may be made as to whether additional VLANs need to be migrated. If additional VLANs need to be migrated, then method 600 may proceed back to step 604. Otherwise the method migrating from MSTP to ERPS protocol may be completed.

Although illustrated as separate methods in FIGS. 5 and 6, any of the operations depicted in methods 500 and 600 may be combined, rearranged, and/or omitted as desired. Any of the operations of methods 500 and 600 may be performed manually by, for example, a network administrator using a network management system and/or an operation support system to execute each operation. Also, any of the operations of methods 500 and 600 may be performed in an automated manner by a script, program, and/or executable. In some embodiments, a combination of manual and automated means may be used to perform one or more of the operations of methods 500 and 600.

By migrating from MSTP to ERPS protocol according to this disclosure, a VLAN may seamlessly transition between the loop-breaking protocols without affecting the performance or reliability of the network during the migration. During the migration, the network may be continue to pass data packets between the network elements without delay or outages that may otherwise be associated with migrating from MSTP to ERPS protocol on a live network. Thus, a network may gain the benefits of migrating to ERPS protocol without impacting customers or users of the network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for migrating an Ethernet network from a multiple spanning tree protocol (MSTP) to Ethernet ring protection switching (ERPS), the method comprising:
    selecting a virtual local area network (VLAN) implementing a MSTP from a plurality of VLANs operating on the Ethernet network, the MSTP having a spanning tree with a root network element coupled to a first branch of network elements;
    disabling a virtual network link in the VLAN;
    migrating a first leaf network element of the first branch in the VLAN by disabling the MSTP running on the first leaf network element and enabling an ERPS protocol on the first leaf network element;
    migrating a second leaf network element after the first leaf network element by disabling the MSTP running on the second leaf network element and enabling the ERPS protocol on the second leaf network element, the second leaf network element forming a second branch of the spanning tree;
    migrating a plurality of network elements after the first leaf network element and the second leaf network element by disabling the MSTP running on the plurality of network elements and enabling the ERPS protocol on the plurality of network elements, the plurality of network elements forming the first branch and the second branch of the spanning tree;
    migrating the root network element in the VLAN after migrating the first leaf network element, the second leaf network element, and the plurality of network elements by disabling the MSTP running on the root network element and enabling the ERPS protocol on the root network element; and
    enabling the virtual network link after the disabling of the MSTP running on the first leaf network element, the second leaf network element, the plurality of network elements, and the root network element and the enabling of the ERPS protocol on the first leaf network element, the second leaf network element, the plurality of network elements, and the root network element such that the ERPS protocol is enabled on all network elements comprising the Ethernet network and MSTP is disabled on all network elements comprising the Ethernet network.

2. The method of claim 1, wherein the disabled virtual network link is a virtual network link already disabled by the MSTP to break a loop in the VLAN.

3. The method of claim 1, further comprising designating the first leaf network element as an ERPS ring protection link owner in charge of preventing a network loop.

4. The method of claim 1, wherein the plurality of network elements forming the first branch are migrated in order from the first leaf network element to the root network element and the plurality of network elements forming the second branch are migrated in order from the second leaf network element to the root network element.

5. A network element in an Ethernet network, comprising:
    a processor;
    non-transitory computer readable memory media accessible to the processor,
    wherein the memory media store processor-executable instructions to migrate the Ethernet network from a multiple spanning tree protocol (MSTP) to Ethernet ring protection switching (ERPS), the instructions, when executed by the processor, cause the processor to:
        select a virtual local area network (VLAN) implementing a MSTP from a plurality of VLANs operating on the Ethernet network, the MSTP having a spanning tree with a root network element coupled to a first branch of network elements;
        disable a virtual network link in the VLAN;

migrate the first leaf network element of the first branch in the VLAN by disabling the MSTP running on the first leaf network element and enabling an ERPS protocol on the first leaf network element;

migrate a second leaf network element after the first leaf network element by disabling the MSTP running on the second leaf network element and enabling the ERPS protocol on the second leaf network element, the second leaf network element forming a second branch of the spanning tree;

migrate a plurality of network elements after the first leaf network element and the second leaf network element by disabling the MSTP running on the plurality of network elements and enabling the ERPS protocol on the plurality of network elements, the plurality of network elements forming the first branch and the second branch of the spanning tree;

migrate the root network element in the VLAN after the first leaf network element, the second leaf network element, and the plurality of network elements by disabling the MSTP running on the root network element and enabling the ERPS protocol on the root network element; and enable the virtual network link after the disabling of the MSTP running on the first leaf network element, the second leaf network element, the plurality of network elements, and the root network element and the enabling of the ERPS protocol on the first leaf network element, the second leaf network element, the plurality of network elements, and the root network element such that the ERPS protocol is enabled on all network elements comprising the Ethernet network and MSTP is disabled on all network elements comprising the Ethernet network.

6. The network element of claim 5, wherein the disabled virtual network link is a virtual network link already disabled by the MSTP to break a loop in the VLAN.

7. The network element of claim 5, further comprising instructions executable to designate the first leaf network element as an ERPS ring protection link owner in charge of preventing a network loop.

8. The network element of claim 5, wherein the plurality of network elements forming the first branch are migrated in order from the first leaf network element to the root network element and the plurality of network elements forming the second branch are migrated in order from the second leaf network element to the root network element.

9. A method for migrating an Ethernet network from a multiple spanning tree protocol (MSTP) to Ethernet ring protection switching (ERPS), the method comprising:

selecting a virtual local area network (VLAN) implementing a MSTP from a plurality of VLANs operating on the Ethernet network, the MSTP having a spanning tree with a root network element coupled to a first branch of network elements;

disabling a virtual network link in the VLAN;

disabling the MSTP on the first leaf network element of the first branch;

disabling the MSTP on a second leaf network element after the first leaf network element, the second leaf network element forming a second branch of the spanning tree;

disabling MSTP on a plurality of network elements after the first leaf network element and the second leaf network element, the plurality of network elements forming the first branch and the second branch of the spanning tree;

disabling the MSTP on the root network element after disabling the MSTP on the first leaf network element, the second leaf network, and the plurality of network elements;

enabling ERPS protocol on the first leaf network element;

enabling ERPS protocol on the second leaf network element after enabling ERPS protocol on the first leaf network element;

enabling ERPS protocol on the plurality of network elements after enabling ERPS protocol on the first leaf network element and the second leaf network element;

enabling ERPS protocol on the root network element after enabling ERPS protocol on the first leaf network element, the second leaf network element, and the plurality of network elements;

enabling the virtual network link after the disabling the MSTP running on the first leaf network element, the second leaf network element, the plurality of network elements, and the root network element and the enabling ERPS protocol on the first leaf network element, the second leaf network element, the plurality of network elements, and the root network element such that the ERPS protocol is enabled on all network elements comprising the Ethernet network and MSTP is disabled on all network elements comprising the Ethernet network.

10. The method of claim 9, wherein the disabled virtual network link is a virtual network link already disabled by the MSTP to break a loop in the VLAN.

11. The method of claim 9, further comprising designating the first leaf network element as an ERPS ring protection link owner in charge of preventing a network loop.

12. The method of claim 9, wherein the MSTP is disabled on the plurality of network elements forming the first branch in order from the first leaf network element to the root network element and the MSTP is disabled on the plurality of network elements forming the second branch in order from the second leaf network element to the root network element.

13. The method of claim 9, wherein ERPS protocol is enabled on the plurality of network elements forming the first branch in order from the first leaf network element to the root network element and the ERPS protocol is enabled on the plurality of network elements forming the second branch in order from the second leaf network element to the root network element.

* * * * *